(12) United States Patent
Suresh et al.

(10) Patent No.: US 9,565,657 B2
(45) Date of Patent: Feb. 7, 2017

(54) IOT ENABLED WIRELESS ONE-GO/ALL-GO PLATFORM SENSOR NETWORK SOLUTION FOR CONNECTED HOME SECURITY SYSTEMS

(71) Applicant: Honeywell International Inc., Morristown, NJ (US)

(72) Inventors: Sandeep Suresh, Bangalore (IN); Nagaraj Chickmagalur Lakshminarayan, Bangalore (IN); Kenneth G. Eskildsen, Great Neck, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 203 days.

(21) Appl. No.: 14/337,840

(22) Filed: Jul. 22, 2014

(65) Prior Publication Data

US 2016/0029346 A1    Jan. 28, 2016

(51) Int. Cl.
*H04L 12/18* (2006.01)
*H04W 74/08* (2009.01)
(Continued)

(52) U.S. Cl.
CPC ............ *H04W 72/005* (2013.01); *G08B 17/10* (2013.01); *G08B 25/10* (2013.01); *H04J 3/16* (2013.01);
(Continued)

(58) Field of Classification Search
CPC ...... H04W 84/18; H04W 4/005; H04W 12/06; H04W 28/06; H04W 4/008; H04W 12/02; H04W 84/12; G08B 19/005; G08B 3/10; G08B 17/10; G08B 27/006; G08B 21/0294; G08B 21/0453; G08B 21/14; G08B 25/007; G08B 25/016; G08B 25/14; G08B 27/008; G08B 7/062; G08B 7/066; B60R 2325/02; A62B 5/00; H01Q 1/246; H04B 2203/5408; H04M 1/6066; H04M 1/72513; H04M 1/72516; H04M 1/72538; H04M 2203/205; H04M 2207/18; H04M 2242/04; H05B 37/0227; H05B 37/0272; H04L 61/6059; H04L 67/12; H04L 63/08; H04L 12/2803; H04L 61/6072; H04L 63/0442; H04L 9/0861; H04L 69/08; H04L 63/045
See application file for complete search history.

(56) References Cited

U.S. PATENT DOCUMENTS 4,593,273 A * 6/1986 Narcisse ............ G08B 21/0227
128/903
5,193,216 A * 3/1993 Davis ................ H04M 1/72516
340/539.21
(Continued)

FOREIGN PATENT DOCUMENTS

WO    WO 2009/116682 A1    9/2009
WO    WO 2010/146174 A2    12/2010

OTHER PUBLICATIONS

Extended European search report for corresponding EP patent application 15176302.6, dated Nov. 25, 2015.

*Primary Examiner* — Fekadeselassie Girma
(74) *Attorney, Agent, or Firm* — Husch Blackwell LLP (57) ABSTRACT

A system is provided that includes a base station of a security system having a wireless transceiver, a processor of the base station that periodically transmits a beacon under a 6LowPan/Iot protocol defining an information transfer super frame having a plurality of time division multiple access (TDMA) slots, a plurality of remotely located devices, each with a sound transducer and a wireless transceiver that exchanges messages with the base station within the TDMA (Continued)

slots of the super frame, and a respective processor within each of the plurality of remotely located devices that determines a sound activation pattern and a location of a multicast slot within the super frame from the beacon, detects an activation message within the multicast slot, and activates the sound transducer based upon the location of the multicast slot in accordance with the sound activation pattern.

20 Claims, 4 Drawing Sheets (51) Int. Cl.
  *H04W 84/18* (2009.01)
  *H04W 72/00* (2009.01)
  *G08B 17/10* (2006.01)
  *G08B 25/10* (2006.01)
  *H04J 3/16* (2006.01)

(52) U.S. Cl.
  CPC ......... *H04L 12/189* (2013.01); *H04L 12/1845* (2013.01); *H04W 74/0816* (2013.01); *H04W 84/18* (2013.01)

(56) References Cited

U.S. PATENT DOCUMENTS

| | | | | |
|---|---|---|---|---|
| 5,684,790 A * | 11/1997 | Hirasawa | ............... | H04W 88/02 340/539.1 |
| 6,356,771 B1 * | 3/2002 | Dent | ...................... | H01Q 1/246 455/277.1 |
| 7,359,738 B2 * | 4/2008 | Daniels | ............... | H04M 1/6066 379/420.04 |
| 8,325,627 B2 * | 12/2012 | Pratt, Jr. | .................. | H04L 12/66 370/255 |
| 2005/0195088 A1 | 9/2005 | Solak | | |
| 2006/0265195 A1 * | 11/2006 | Woodard | ............... | G08B 25/08 702/188 |
| 2007/0268884 A1 | 11/2007 | Kolavennu et al. | | |
| 2007/0279242 A1 * | 12/2007 | Plocher | ..................... | A62B 5/00 340/692 |
| 2007/0296575 A1 * | 12/2007 | Eisold | .................. | G08B 27/006 340/539.16 |
| 2008/0279155 A1 * | 11/2008 | Pratt, Jr. | .................. | H04L 12/66 370/336 |
| 2008/0316966 A1 * | 12/2008 | Joshi | ..................... | H04W 74/02 370/330 |
| 2009/0042546 A1 * | 2/2009 | McClendon | ......... | G08B 27/006 455/414.1 |
| 2009/0112626 A1 * | 4/2009 | Talbot | .................... | G06Q 50/24 705/3 |
| 2009/0203971 A1 * | 8/2009 | Sciarappa | .......... | G08B 21/0453 600/301 |
| 2010/0102940 A1 * | 4/2010 | Baldwin | .................. | G08B 3/10 340/384.6 |
| 2010/0176952 A1 * | 7/2010 | Bajcsy | ..................... | A61B 5/11 340/573.1 |
| 2010/0271220 A1 | 10/2010 | Pattok et al. | | |
| 2011/0176465 A1 * | 7/2011 | Panta | ................ | H04W 52/0235 370/311 |
| 2012/0106394 A1 * | 5/2012 | Apostolakis | ............ | H04L 69/18 370/254 |
| 2012/0126700 A1 * | 5/2012 | Mayfield | ........... | H05B 37/0272 315/86 |
| 2014/0126655 A1 * | 5/2014 | Vijayasankar | ........... | H04B 3/54 375/257 |
| 2014/0218194 A1 * | 8/2014 | Gruber | ................. | G08B 19/005 340/540 |
| 2014/0341109 A1 * | 11/2014 | Cartmell | .................. | H04L 45/308 370/328 |
| 2014/0376427 A1 * | 12/2014 | Hui | ........................... | H04L 5/16 370/296 |
| 2015/0302728 A1 * | 10/2015 | Gettings | .............. | G08B 29/181 340/506 |

* cited by examiner

IOT ENABLED WIRELESS ONE-GO/ALL-GO PLATFORM SENSOR NETWORK SOLUTION FOR CONNECTED HOME SECURITY SYSTEMS

FIELD

This field of this invention relates to security systems and more particularly to networked security systems.

BACKGROUND

Systems are known to detect threats within secured areas. Threats may be based upon the occurrence of any of a number of different events that represent a risk to human safety or security or a risk to assets. For example, a fire may represent a threat to human occupants of a secured area not only because of the possibility of burns but also because of the possibility of death due to smoke inhalation.

The presence of unauthorized intruders within a secured area may also represent a threat in the case where the intruder may be a burglar intent on the theft of assets. However, a burglar could also be a threat to the safety of human occupants who interfere with the theft.

Security systems are typically based upon the use of one or more sensors that detect a specific threat within the area. The sensors may be fixed devices and/or mobiles devices such as a FOB. For example, fire, smoke and/or intrusion detectors may be distributed throughout a secured area in order to mitigate damage through the early detection of fire or intrusion. The sensors can be supervised or unsupervised.

In most cases, the sensors may be monitored by a control panel. In the event that one of the sensors is activated, the control panel may activate a local audible alarm to warn occupants in the area of the threat. The control panel may also send an alarm message to a central monitoring station. A portable device, such as key fob may be used to send emergency alerts (e.g., panic alarms, medical alerts, police, etc.) to the control panel and also to send commands (e.g., arm, disarm, etc.) to the control panel. The control panel may also include a keypad and an audible siren.

Security systems may cover numerous zones and include a number of different types of sensors and warning devices. In order to reduce costs and accommodate the different devices, the control panel and sensors may be connected via a wireless interface.

However, a security system using wireless sensors may be difficult to set up. Accordingly, a need exists for better methods of establishing and maintaining contact between a control panel and each of the sensors in a wireless security system.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Figure 1:
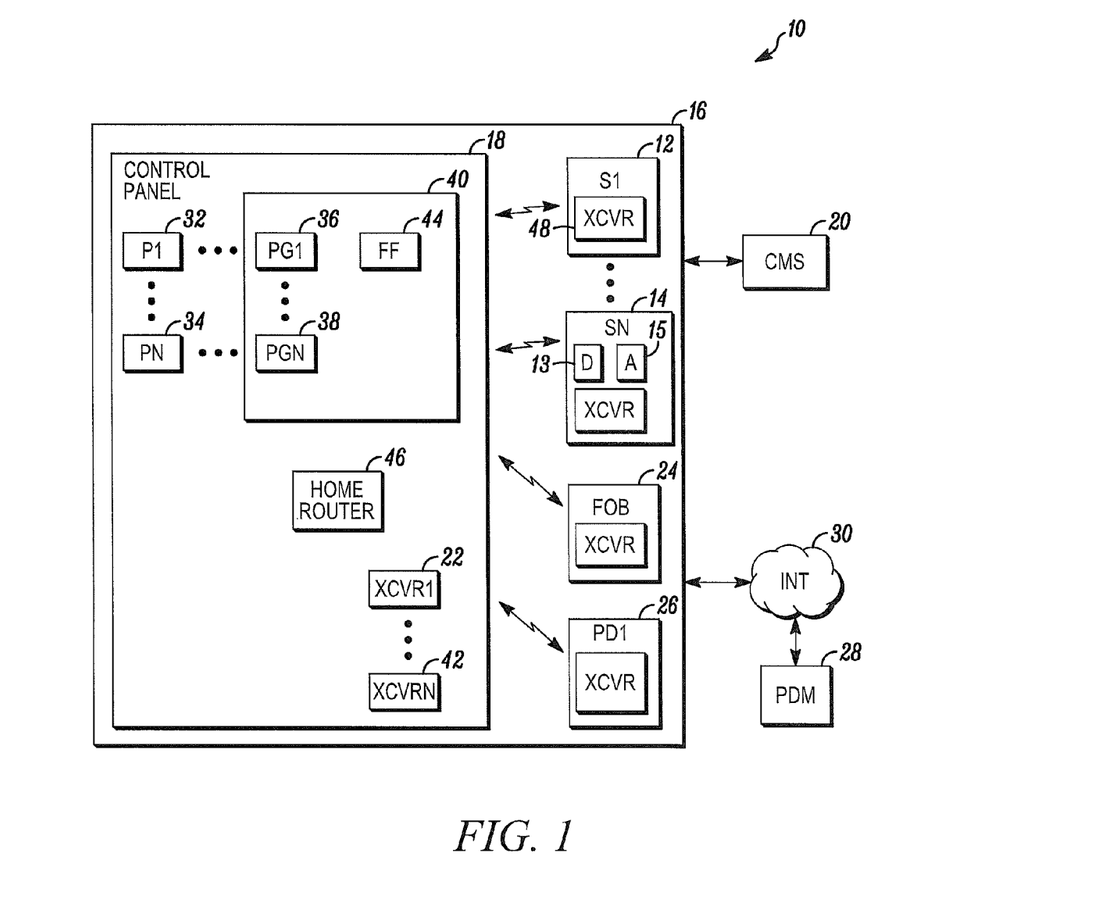
FIG. 1 illustrates a block diagram of a security system in accordance herewith.

FIG. 1 is a block diagram of a security system 10 shown generally in accordance with an illustrated embodiment. Included within the security system may be one or more remotely located sensing devices (sensors) 12, 14 that monitor a secured area 16 for threats.

The sensors may each include a detector 13 based upon any of a number of different sensing technologies. For example, one or more of the sensors may be fire, smoke or gas detectors. Some other of the sensors may be intrusion detectors. The sensors may also be provided with respective audible or visual alerting devices 15 that alert human occupants to danger. In a more general sense, the term "remotely located device" may also be used herein to generically refer to a remotely located sensing or to a similar device with a sounder but without a detector that merely operates to warn occupants within the secured area of threats. The remotely located devices may also include other wireless devices such as key fobs or keypads.

The sensors may be monitored for activation by a control panel 18 containing a radio or gateway. The control panel may be located within the secured area as shown in FIG. 1 or may be located remotely from the secured area.

Upon activation of one of the sensors, the control panel may send an alarm message to a central monitoring station 20. The alarm message may include an identifier of the security system (e.g., account number, address, etc.), an identifier of the type of sensor, a system or zone identifier of the sensor and a time of activation of the sensor.

The central monitoring station may respond by summoning the appropriate help. For example, if the sensor is determined to be a fire sensor, then the central monitoring station may summon a local fire department. On the other hand, if the sensor is identified to be an intrusion sensor, then the central monitoring station may summon the police.

All of the remotely located devices may be coupled to the control panel via a wireless interface. In this regard, a radio frequency (rf) transceiver 22, 48 within the control panel and each of the remotely located devices may together form a portion of a wireless interface that allows each of the remotely located devices to exchange messages with the control panel.

The security system may also include one or more wireless fobs 24 and/or wireless keypads 24 that are used to control a state of the security system (e.g., armed, disarmed, armed away, etc.). Each of the fobs may also include a user interface (e.g., pushbuttons, and indicator LEDs) and a wireless rf transceiver that allows each fob to exchange control messages with the control panel. Key pads may also include a user interface (e.g., keyboard and display and a wireless rf transceiver that allows each key pad to exchange control messages with the control panel.

Also included within the secured area may be one or more portable wireless devices (e.g., iPhones, Android devices, etc.) 26. The portable device 26 may exchange data with one or more other devices 28 through the Internet 30 under an appropriate format (e.g., TCP/IP, etc.).

The portable wireless devices 26 may exchange signals through the Internet via one or more WiFi transceivers 42 located within the secured area. The WiFi transceivers may be coupled to a local Internet service provider via a home router 46 and a hardwired connection between the control panel and local Internet service.

Included within the control panel, the sensors, the fob and portable wireless devices is control circuitry that may include one or more processor apparatus (processors) 32, 34, each operating under control of one or more computer programs loaded from a non-transitory computer readable medium (memory) 40. As used herein, reference to a step performed by a computer program is also reference to the processor that executed that step.

Included within the control panel may be one or more communication processors that define 44 a super frame for communication between the control panel, the sensors, fobs and portable wireless devices.

The super frame may be defined within a frame file 44 by a number of time division multiple access (TDMA) slots that re-occur over a predetermined time period. At least some of the slots may be reserved for use by the sensors and/or fobs under a 6LowPan/IPv6/IoT protocol. At least some other of the slots may be reserved for use by the portable wireless devices under an IEEE802.11 or WiFi protocol. FIG. 1 shows two transceivers 22, 42 (one for the 6LowPan/IPv6/Iot protocol and one for the IEEE802.11 protocol).

Figure 2:
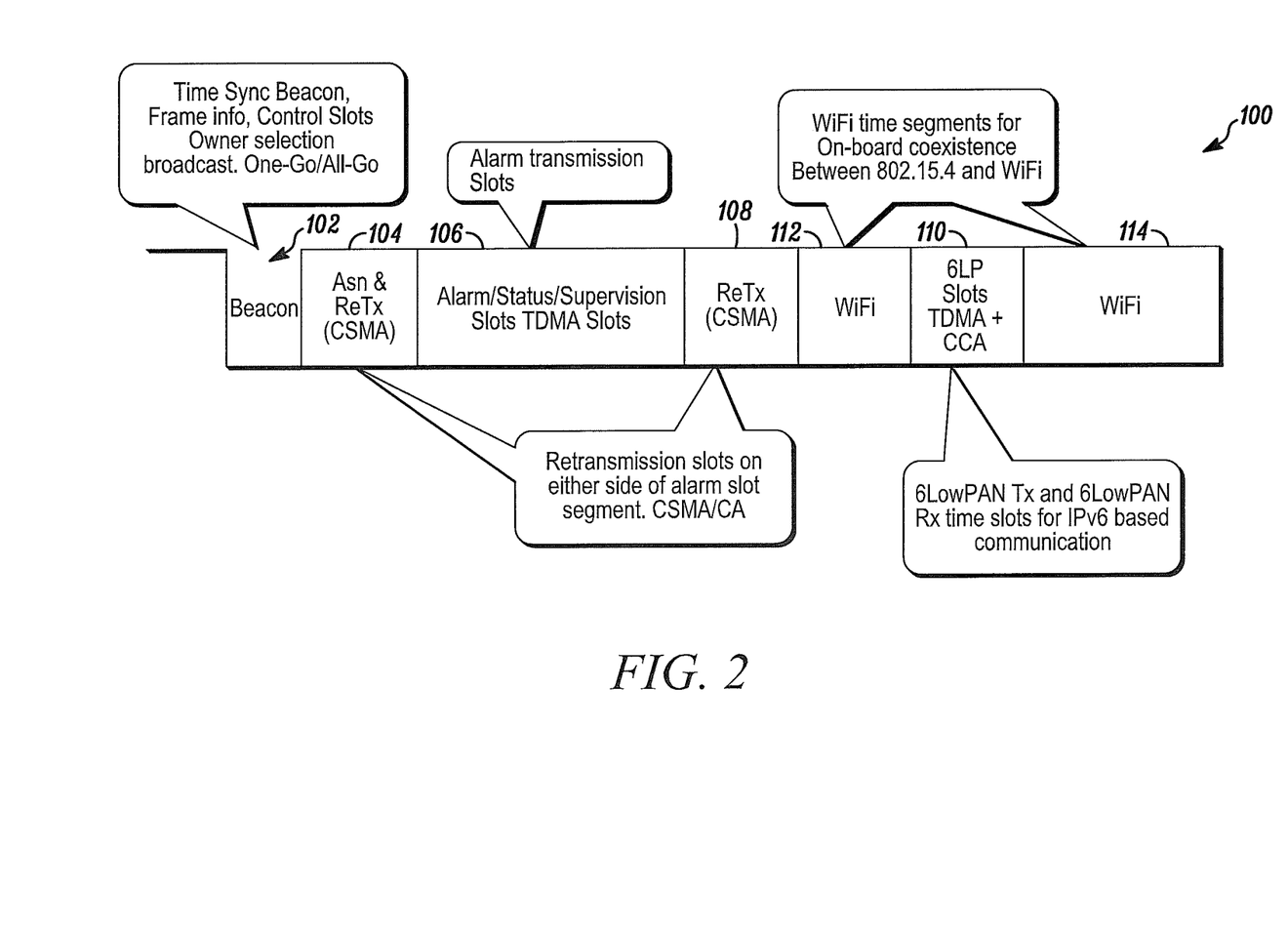
FIG. 2 depicts a super frame that may be used by the system of FIG. 1.

FIG. 2 depicts an example of the super frame 100 used within the system of FIG. 1. The superframe is multidisciplinary because it supports standards such as IEEE802.15.4, 6LowPan and also facilitates coexistence with other systems such as IEEE802.11 and ZigBee bases systems.

As shown, the super frame includes a slot 102 for a beacon, a first set of slots 104, 106, 108, 110 reserved for the exchange of messages between the sensors and the control panel and between the fob and control panel under the IEEE 802.15.4 and 6LowPAN protocol. A second set of slots 112, 114 is reserved for the exchange of messages between the portable wireless devices and the Internet under a WiFi protocol.

The frame may be embodied as a number of time thresholds distributed across the sensors and coordinators that identify the locations of various markers within the super frame. For example, the slot 102 may be identified by a starting time (i.e., zero seconds) and an ending time (e.g., 5 milliseconds). Similarly, the starting and ending times of each of the first and second sets of slots may be defined by their offset from the start of the super frame. In addition, the frame file may also include an identifier of the type of device allowed to use each slot as well as an indicator of the type of message that may be transmitted in any slot.

The beacon identifies a starting point of the super frame and incorporates a number of data fields defined and populated by a beacon processor. The data fields of the beacon may include a first field for frame information and one or more control slots.

Figure 3:
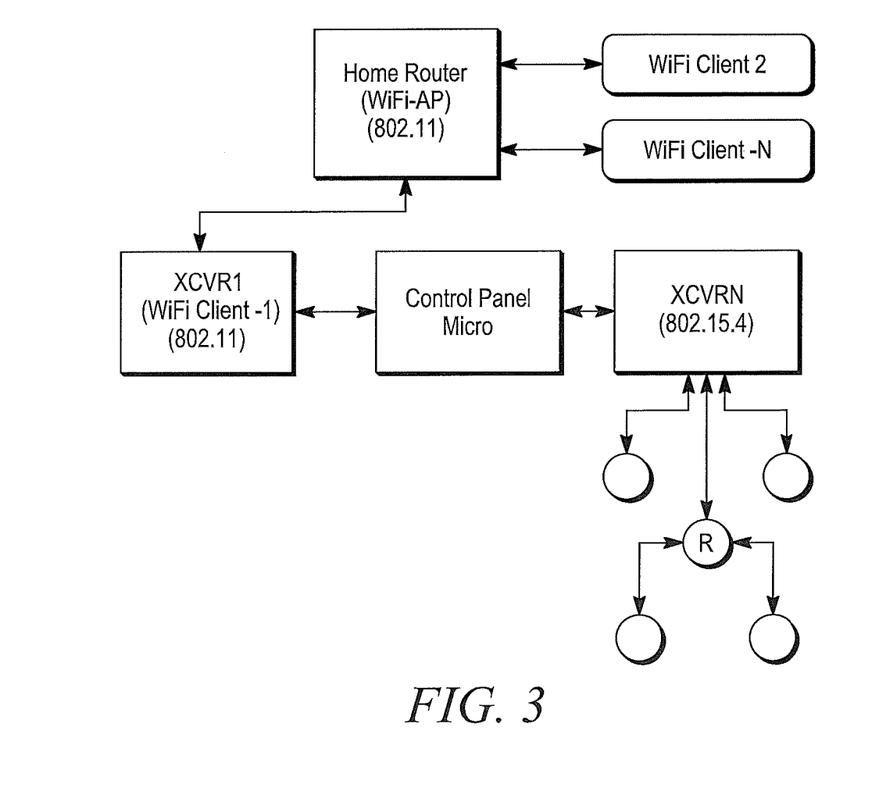
FIG. 3 depicts a wireless connection diagram between sensors and the control panel of FIG. 1.

Each device (e.g., sensors, fobs, etc.) in the system of FIG. 1 has a short address and an IPv6 (6LowPan) address and a MAC identifier (MAC ID). The addressing system facilitates accessing of the sensors and fobs by any other IPv6 compatible device as described in various Internet of Things (IoT) publications. This allows the sensors to be arranged by respective processors into star or tree networks as shown in FIG. 3, but not into a mesh network.

The status of the control panel (e.g., armed, disarmed, trouble, etc.) is carried as part of the beacon payload. Also, if required, a detailed indicator of panel status may be carried within respective slots under the 6LowPAN/802.15.4 protocols.

The control slots of the beacon may be used by a message processor of the control panel to send request messages from the control panel to end devices (e.g., sensors, fobs, etc.) using a unicast, multicast, or broadcast format based upon the IEEE802.15.4 addresses of the end devices. One type of message transmitted within the control slots is a One-Go/All-Go message that is received and processed by each remotely located device and where the audible and/or visual alerting device of each remotely located device is activated simultaneously in response to an alarm event or message received from one of the sensors.

Any of a number of different types of devices may be incorporated into the system as sensors. The devices may be enrolled into the system via a manual enrollment or by a downloader based enrollment mode supported by an enrollment processor. The frame file may be downloaded to the sensors and fobs during commissioning or at the start of each super frame within one of the control slots.

Within the first set of slots of the super frame, a first portion 106 is reserved for alarm, status and supervision messages between the control panel and sensors. As alarms, status and supervision messages have limited data size, an IEEE802.15.4 packet format is used by a corresponding packet processor to optimize the airtime of these messages. This protocol supports the star or tree topology needed to accommodate scenarios that demand a larger range.

In general, network information from the control panel is based upon a dynamic PAN-ID and a 802.15.4 channel number for single channel operation. Sensors and/or fobs conforming with this format may enroll with the control panel automatically and immediately after activation. End device commissioning of each sensor may be based upon a common secret message encryption key and end device unique MAC-ID.

Sensors may arrange themselves into the star or tree topology including a PAN coordinator, repeater and one or more end devices based upon this information. Packet exchanges between parent and child devices may occur using one or more slots of portion 104, 106, 108, 110 and not 112 and not 114. DNA profile transmissions (i.e., the sensor identifies what it is) and configuration transactions between coordinator and end devices may be used to facilitate the arranging of these devices into the star or tree topology.

For end devices that are too far from the control panel, a coordinator may forward the beacon. In this case, the coordinator operates as a low power repeater system with dynamic end device wake-up and synchronization.

Alarms, status and supervisory messages to the control panel may result in bi-directional communication between the control panel and end devices. Secured encrypted communication over the air for each message may be accomplished using network keys.

Alarm messages from a sensor to the control panel may be accomplished via one of the slots of the second portion 106. In this case, the activated sensor may wake-up upon the occurrence of the event (e.g., fire, intrusion, etc.). An alarm processor within the sensor may detect the event, compose an alarm message, synchronize with its superframe beacon, identify a slot based upon the frame file and transmit the alarm message at a corresponding location within the super frame. Each slot of the TDMA super frame may include sufficient time for transmission of an encrypted packet plus enough time for a MAC level ACK message from the parent.

If a sensor does not receive an ACK message within a slot of the first portion 106, then the alarm processor of the sensor may resend the alarm message under a carrier sense multiple access and collision avoidance CSMA/CA algorithm or mechanism (CSMA/CA algorithm/mechanism). In this case, the activated sensor may select a slot within one of the portions 104, 108 by first attempting to sense other users. If no other user is detected, the sensor may retransmit the alarm message to the control panel within the selected slot.

WiFi devices may operate in one or both of slot portions 112, 114. A strobe to devices operating under this protocol may be sent based upon slot availability at the end of the super frame. Alternatively, WiFi devices may synchronize via hardwired signals.

Figure 4:
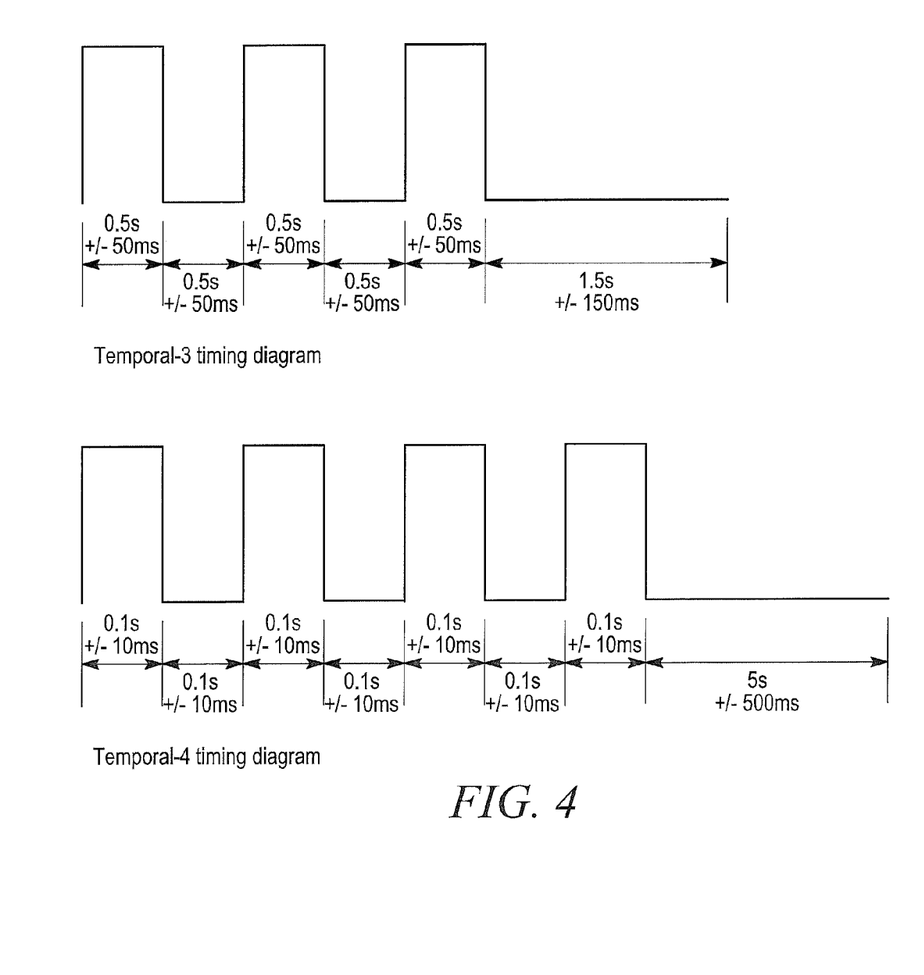
FIG. 4 depicts a set of temporal patterns that may be used by the system of FIG. 1.

Turning now to the remotely located devices 12, 14, in specific, different types of alarms may require different audible and/or visual alerts based upon the type of threat present within the secured area. For example, remotely located devices (e.g., smoke detectors, CO detectors, sounders, etc.) which are spread across the secured area in a typical sensor network should synchronize their alerting devices 15 (e.g., sounders) so that when one of the sounders is activated by a signal from one type of sensor, all of the remaining remotely located devices having the same type of sensor (i.e., detector 13) and its sounder (i.e., alerting device 15) should join the sounding pattern with the same phase and pattern. The cadence is specified, and recommended by the National Fire Protection Association (NFPA). For example, the NFPA recommends a Smoke Alarm Temporal 3 Activation Signal in NFPA 72, 2010 Edition A.29.3.5 and a Carbon Monoxide Alarm Temporal 4 Activation Signal in NFPA 720, 2010 Edition 5.8.6.5.1 as shown in FIG. 4.

However, the NFPA fails to provide any way of synchronizing the cadences among many sounding devices. For example, wireless sensors using CSMA/CA will remain completely unsynchronized during operation. This is because each of the sensors independently sleeps and wakes up and are therefore not synchronized. Even if they can be synchronized via the exchange of an appropriate set of packets, there will be latencies associated with packet transmission and reception that may exceed NFPA requirements.

In addition, many systems will have different combinations of smoke and CO sensors in a network. However, there is no reference mechanism to synchronize the different types of sensors for different temporal patterns. In addition, when single level and multi-level repeaters are added into the network to increase the range of devices, the repeaters introduce latencies that exacerbate the problem of synchronism.

Under the illustrated embodiment, synchronization of the remotely located devices (e.g., smoke detectors, CO detectors, sounders, etc.) is accomplished via the system described above based upon use of the 6LowPan/IPv6 protocol. In addition, the MAC layer follows the IEEE802.15.4 standard on top of which a socket based UDP/IPv6 based network layer resides for IoT based communication. This allows each of the remotely located devices to have a unique IPv6 address and to follow the 6LowPan standard for low power wireless sensor networks. All of the remotely located devices, including the 6LowPan/IPv6 enabled repeaters are time-synchronized using a PAN coordinator. The PAN coordinator generates beacons at regular intervals so that all of the remotely located devices can sleep, wake-up and synchronize to a common beacon. The beacon operates to indicate the synchronizing temporal pattern that is unique at least for alarms originating from a smoke sensor and for a CO sensor.

In general, the beacon may be divided into a number of different portions with each portion directed to a particular type (address) of remotely located device. The specific portion directs each type of remotely located device to a specific slot in the super frame. The remotely located device may retrieve the specific pattern from the slot. Stated in another way, the multicast 6LowPan/IPv6 address will be notified in the super frame at a specific slot location offset from the beacon as to the particular pattern to be used. The sensor types that support only that multicast IPv6 address will respond by activating their sounders at the specific pattern as indicated in the synchronizing beacon.

Each remotely located device may have a hardware timer. As the timings are handled using the hardware timer specific to the baseband controller and there is an external high accurate crystal oscillator for each sensor, the synchronizing timings and sounder activation phases will be highly accurate. When there are multiple levels of repeaters in the system, as each repeater synchronizes with its parent and the timing offset is accurate, this synchronization will avoid any phase offset between sensors connected to the PAN coordinator and the sensors connected to the highest depth repeater in the tree network.

The above system offers a number of advantages over prior devices. First the system provides a single platform solution to individually address smoke sensor, CO sensor and sounders so as to participate in the one-go/all-go concept of audible activation. Second the concept can be easily enhanced to accommodate other types of sensors with different temporal patterns. The one-go/all-go control mechanism based upon 6LowPan/IPv6 multicast addresses can be easily expanded so that any IoT enabled device can participate.

These concepts are easily adapted to home networks, so that whenever there is a smoke or CO alarm, the control panel and/or sounders can annunciate the alarm with a pre-recorded voice. The one-go/all-go feature can be suppressed by sending a command from a mobile phone to the security panel. If there are other remotely located devices within the home which are IoT enabled (e.g., door locks) and have sounders, they can even guide people in case of emergency to use specific doors. For example, if there is a fire in a garage at night and the owner is sleeping, a 6LowPan/IPv6 enabled lighting system can be switched on automatically to help the owner vacate the premises safely.

In general, the system includes a base station of a security system having a wireless transceiver, a processor of the base station that periodically transmits a beacon under a 6LowPan/IoT protocol defining an information transfer super frame having a plurality of time division multiple access (TDMA) slots, a plurality of remotely located devices, each with a sound transducer and a wireless transceiver that exchanges messages with the base station within the TDMA slots of the super frame and a respective processor within each of the plurality of remotely located devices that determines a sound activation pattern and a location of a multicast slot within the super frame from the beacon, detects an activation message within the multicast slot and activates the sounder transducer based upon the location of the multicast slot in accordance with the sound activation pattern.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
a base station of a security system having a wireless transceiver;
a processor of the base station that periodically transmits a beacon under an Internet Protocol version 6 (IPv6) over Low Power Wireless Personal Area Networks (6LowPan)/Internet of Things (IoT) protocol defining an information transfer super frame having a plurality of time division multiple access (TDMA) slots, wherein the beacon is included in a first slot of the plurality of TDMA slots;
a plurality of remotely located devices, wherein each of the plurality of remotely located devices includes a sound transducer and a wireless transceiver that exchanges messages with the base station within respective ones of the plurality of TDMA slots of the information transfer super frame; and
a respective processor within each of the plurality of remotely located devices that determines a location of a multicast slot within the information transfer super frame and a sound activation pattern from the beacon, detects an activation message within the multicast slot, and activates the sound transducer of a respective one of the plurality of remotely located devices based upon the sound activation pattern,
wherein the beacon is divided into a plurality of portions, and
wherein each of the plurality of portions directs one of the plurality of remotely located devices to one of the plurality of TDMA slots in the information transfer super frame.

2. The system as in claim 1 wherein at least some of the plurality of remotely located devices comprise a visual indicator activated in accordance with the sound activation pattern.

3. The system as in claim 1 wherein the processor of the base station transmits the activation message and the sound activation pattern in the beacon with a multicast short address or as a 6LowPAN based multicast message within a predetermined one of the plurality of TDMA slots of the information transfer super frame.

4. The system as in claim 1 wherein the respective processor of each of the plurality of remotely located devices activates the sound transducer of the respective one of the plurality of remotely located devices synchronously with the sound transducer of each of the plurality of remotely located devices.

5. The system as in claim 1 wherein at some of the plurality of remotely located devices comprise a combustion detector.

6. The system as in claim 5 wherein the respective processor of each of the at least some of the plurality of remotely located devices monitors the combustion detector of the respective one of the plurality of remotely located devices for indication of a fire and sends a fire alarm message to the base station.

7. The system as in claim 6 wherein the processor of the base station detects the fire alarm message and sends the activation message to each of the plurality of remotely located devices to activate the sound transducer of the respective one of the plurality of remotely located devices.

8. The system as in claim 7 wherein the combustion detector comprises one of a smoke detector and a carbon monoxide detector.

9. The system as in claim 8 wherein the sound activation pattern comprises a first sound activation pattern for detection of smoke and a second sound activation pattern for detection of carbon monoxide.

10. The system as in claim 1 further comprising a lamp disposed on each of the plurality of remotely located devices that illuminates an area adjacent to the respective one of the plurality of remotely located devices in response to receipt of the activation message.

11. A system comprising:
a security system that protects a secured area;
a base station of the security system having a wireless transceiver;
a processor of the base station that periodically transmits a beacon through the wireless transceiver, wherein the beacon provides a time reference for a plurality of time division multiple access (TDMA) slots that together form a repeating super frame under an Internet Protocol version 6 (IPv6) over Low Power Wireless Personal Area Networks (6LowPan)/Internet of Things (IoT) protocol, and wherein the beacon is included in a first slot of the plurality of TDMA slots;
a plurality of remotely located devices located within the secured area, wherein each of the plurality of remotely located devices includes a sound transducer and a wireless transceiver that exchanges messages with the base station through respective ones of the plurality of TDMA slots of the repeating super frame; and
a respective processor within each of the plurality of remotely located devices that determines a multicast slot within the repeating super frame for receipt of sound transducer activation messages from the beacon, detects one of the sound transducer activation messages including a sound activation pattern within the multicast slot, and activates the sound transducer of a respective one of the plurality of remotely located devices in accordance with the sound activation pattern,
wherein the beacon is divided into a plurality of portions, and
wherein each of the plurality of portions directs one of the plurality of remotely located devices to one of the plurality of TDMA slots in the repeating super frame.

12. The system as in claim 11 wherein at least some of the plurality of remotely located devices comprise a combustion sensor.

13. The system as in claim 12 wherein the combustion sensor comprises one of a smoke detector and a carbon monoxide (CO) detector.

14. The system as in claim 13 wherein the sound activation pattern comprises a first sound activation pattern for smoke and a second sound activation pattern for carbon monoxide.

15. The system as in claim 11 wherein the beacon comprises a plurality of beacons juxtapositioned within one of the plurality of TDMA slots of the repeating super frame, and wherein each of the plurality of beacons is based upon an IPv6 address of at least some of the plurality of remotely located devices.

16. The system as in claim 12 wherein the respective processor of one of the at least some of the plurality of remotely located devices monitors the combustion sensor for activation and upon detecting the activation of the combustion sensor, sends an alarm message to the base station including an IPv6 address of the one of the at least some of the plurality of remotely located devices.

17. The system as in claim 16 wherein the processor of the base station detects the alarm message and sends the one of the sound transducer activation messages to each of the plurality of remotely located devices including the sound activation pattern associated with the combustion sensor of the one of the at least some of the plurality of remotely located devices via the beacon and the multicast slot.

18. A system comprising:
a security system that protects a secured area;
a base station of the security system having a base station wireless transceiver;
a processor of the base station that periodically transmits a beacon through the wireless transceiver, wherein the beacon provides a time reference for a plurality of time division multiple access (TDMA) slots that together form a repeating super frame under an Internet Protocol version 6 (IPv6) over Low Power Wireless Personal Area Networks (6LowPan)/Internet of Things (IoT) protocol, and wherein the beacon is included in a first slot of the plurality of TDMA slots;
a remotely located device located within the secured area having a sound transducer and a device wireless transceiver that exchanges messages with the base station through respective ones of the plurality of TDMA slots of the repeating super frame; and
a processor within the remotely located device that determines a multicast slot within the repeating super frame from the beacon based upon an IPv6 address of the remotely located device for receipt of sound transducer activation messages, detects one of the sound transducer activation messages and a sound activation pattern from the multicast slot, and activates the sound transducer in accordance with the sound activation pattern,
wherein the beacon is divided into a plurality of portions, and
wherein each of the plurality of portions directs the remotely located device to one of the plurality of TDMA slots in the repeating super frame.

19. The system as in claim 18 wherein the remotely located device comprises a combustion detector.

20. The system as in claim 19 wherein the processor of the remotely located device monitors the combustion detector for an indication of fire and upon detecting the fire, sends an alarm message to the base station through one of the plurality of TDMA slots of the repeating super frame.

* * * * *